US009893835B2

(12) United States Patent
Carrascosa et al.

(10) Patent No.: US 9,893,835 B2
(45) Date of Patent: Feb. 13, 2018

(54) AUTO-TUNING RELIABILITY PROTOCOL IN PUB-SUB RTPS SYSTEMS

(71) Applicant: Real-Time Innovations, Inc., Sunnyvale, CA (US)

(72) Inventors: Juan Jose Martin Carrascosa, Granada (ES); Gerardo Pardo-Castellote, Santa Cruz, CA (US); Yusheng Yang, Newark, CA (US); Fernando Crespo Sanchez, Bedford, NH (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 109 days.

(21) Appl. No.: 14/994,995

(22) Filed: Jan. 13, 2016

(65) Prior Publication Data

US 2016/0211940 A1     Jul. 21, 2016

Related U.S. Application Data

(60) Provisional application No. 62/104,318, filed on Jan. 16, 2015.

(51) Int. Cl.
| *H04J 3/16* | (2006.01) |
| *H04L 1/00* | (2006.01) |
| *H04L 29/06* | (2006.01) |
| *H04L 1/18* | (2006.01) |
| *H04L 29/08* | (2006.01) |
| *H04L 12/807* | (2013.01) |

(52) U.S. Cl.
CPC .......... *H04L 1/0002* (2013.01); *H04L 1/0018* (2013.01); *H04L 1/187* (2013.01); *H04L 47/27* (2013.01); *H04L 67/12* (2013.01); *H04L 69/08* (2013.01)

(58) Field of Classification Search
CPC ..... H04L 1/0002; H04L 69/08; H04L 1/0018; H04L 1/187
See application file for complete search history.

(56) References Cited

U.S. PATENT DOCUMENTS

| 6,549,949 | B1* | 4/2003 | Bowman-Amuah ... H04L 69/06 709/236 |
| 6,606,660 | B1* | 8/2003 | Bowman-Amuah . H04L 65/602 709/227 |
| 2002/0178273 | A1* | 11/2002 | Pardo-Castellote .... H04L 67/12 709/230 |
| 2005/0203673 | A1* | 9/2005 | El-Hajj .................. G07C 5/008 701/1 |
| 2006/0059253 | A1* | 3/2006 | Goodman .............. G06Q 10/10 709/223 |
| 2007/0008884 | A1* | 1/2007 | Tang ...................... H04L 29/06 370/230 |

(Continued)

*Primary Examiner* — Ian N Moore
*Assistant Examiner* — Phong La
(74) *Attorney, Agent, or Firm* — Lumen Patent Firm

(57) ABSTRACT

Adaptive tuning techniques are provided for data communications in an Object Management Group (OMG) Real-Time Publish Subscribe (RTPS) Protocol operable over a communication network to provide good throughput/latency tradeoff as well as efficient bandwidth utilization. With this invention, latency under high throughput conditions can be reduced several times compared with the latency obtained with traditional non-adaptive approaches.

1 Claim, 9 Drawing Sheets

(56) References Cited

U.S. PATENT DOCUMENTS

| | | | | |
|---|---|---|---|---|
| 2007/0118842 A1* | 5/2007 | Weida | ............... | G06F 9/465 |
| | | | | 719/330 |
| 2008/0304413 A1* | 12/2008 | Briscoe | ............ | H04L 69/16 |
| | | | | 370/235 |
| 2010/0020689 A1* | 1/2010 | Tang | ............. | H04L 47/10 |
| | | | | 370/235 |
| 2012/0166556 A1* | 6/2012 | Kim | .............. | H04L 67/1065 |
| | | | | 709/206 |
| 2012/0266209 A1* | 10/2012 | Gooding | .......... | H04L 63/20 |
| | | | | 726/1 |
| 2013/0132582 A1* | 5/2013 | Kim | ............. | G06Q 10/06 |
| | | | | 709/226 |

* cited by examiner

| batchSize (bytes) | flushDelay (us) | sampleSize (bytes) | demand (samples/s) | throughput (Mbps) | avg latency (us) |
|---|---|---|---|---|---|
| N/A | N/A | 1024 | 1 | 0 | 34 |
| | | | 100000 | 477 | 598 |
| 32725 | 1000 | 1024 | 20 | 0.2 | 43 |
| | | | 1 | 0 | 2006 |
| | | | 100000 | 786.8 | 44 |
| turbo | 1000 | 1024 | 20 | 0.2 | 2025 |
| | | | 1 | 0 | 35 |
| | | | 100000 | 788.9 | 43 |
| | | | 20 | 0.2 | 735 |

FIG. 11

AUTO-TUNING RELIABILITY PROTOCOL IN PUB-SUB RTPS SYSTEMS

CROSS-REFERENCE TO RELATED APPLICATIONS

This application claims priority from U.S. Provisional Patent Application 62/104,318 filed Jan. 16, 2015, which is incorporated herein by reference.

FIELD OF THE INVENTION

This invention relates to methods and systems for auto-tuning reliable communications in systems using the OMG Real-Time Publish Subscribe (RTPS) Protocol.

BACKGROUND OF THE INVENTION

Many distributed systems employ a publish-subscribe data exchange in which applications publish data samples, which become available to remote applications interested in them.

The Object Management Group (OMG) Real-Time Publish-Subscribe Protocol (RTPS) specification has become one of the popular protocols for publish-subscribe communications. Moreover RTPS is the interoperability wire protocol for systems that implement the OMG Data Distribution Service (DDS) a specification of a publish-subscribe middleware created in response to the need to standardize a data-centric publish-subscribe programming model for distributed systems.

The RTPS protocol provides a way to send data-samples from a Writer to a Reader reliably where each sample is identified by a writer global source identifier (GUID) and a sequence number. Even if the underlying protocol is not reliable, such as UDP (User Datagram Protocol), the messages will be delivered to the Reader in order and missing samples can be resent.

To do that, the RTPS protocol defines three protocol messages:
  HEARTBEAT: Describes the information (samples) that is available in a Writer. HEARTBEAT messages are sent by a Writer to one or more Readers.
  DATA: This message encapsulates a sample containing the application's user data, sequence number and other relevant information.
  ACKNACK: Allows the Reader to inform the Writer about the samples it has received and which ones it is still missing. This message can be used to do both positive and negative acknowledgments. ACKNACK messages are sent in response to HEARTBEATs.

FIG. 1 shows a basic message exchange between a Writer and a Reader. In this exchange one of the samples is lost and subsequently repaired when the Writer receives a NACK.

Although the RTPS protocol describes the basic behavior of Writers and Readers to guarantee interoperability, it does not provide guidelines on how to optimize the sending of DATA, HEARTBEAT, and ACKNACK messages to obtain best performance and resource utilization and adapt to changing network conditions. This is especially critical in dynamic systems where the resources available for a Writer/Reader pair such as bandwidth, CPU, and memory change over time.

For example, a Writer and a Reader could be exchanging DATA messages without losses in a 1 Gb network. The appearance of a new pair Writer/Reader with which they have to share bandwidth may start introducing sample losses. The additional traffic generated by repair DATA messages reduces the available bandwidth, increases the samples' latency, and reduces the throughput for new samples sent from the Writer to the Reader. The network conditions may also change as the data may traverse over shared networks with varying loads, and/or over wireless or radio links whose physical properties may change over time.

To further advance the art, the present invention provides a system and/or method to adaptively auto-tune reliable communications in an RTPS system to provide a good throughput/latency tradeoff as well as efficient bandwidth utilization.

SUMMARY OF THE INVENTION

The present invention provides a method for adaptively auto-tuning data communications over a communication network where an Object Management Group (OMG) Real-Time Publish Subscribe (RTPS) Protocol is operable over the communication network running a software application. Samples are written to an RTPS-Writer, and the RTPS-Writer sends the samples encapsulated in an RTPS-DATA message to an RTPS-Reader. A Send Window is defined between the RTPS-Writer and RTPS-Reader. A Send Window Size in the number of the RTPS-DATA messages is defined between the RTPS-Writer and RTPS-Reader. A Writing Rate is defined for the RTPS-Writer.

A first auto-tuning protocol is implemented as a computer software executable by a computer for dynamically adjusting the Send Window Size based on the number of RTPS-NACK messages received by the RTPS-Writer. The RTPS-NACK message is defined as a message sent from the RTPS-Reader to the RTPS-Writer indicating that some of the RTPS-DATA messages are missing.

A second auto-tuning protocol implemented as a computer software executable by the computer for dynamically adjusting the Sending Rate to avoid that: (i) the number of samples in the Send Window equals the size of the Send Window, and (ii) the RTPS-Writer blocks or yields CPU after filling up Send Window.

A third auto-tuning protocol could further be implemented as a computer software executable by the computer for dynamically adjusting the size of an RTPS-BATCH based on the publication rate. The RTPS-BATCH is defined as an RTPS-DATA message encapsulating more than one sample. The publication rate is defined as the number of samples written with the RTPS-Writer per second.

The first and second auto-tuning protocol of the present invention reduce the communication latency between an RTPS-Writer and an RTPS-Reader under high throughput conditions where high throughput conditions are conditions in which the rate at which samples are published with an RTPS-Writer is greater than the rate at which the samples can be received and positively acknowledged by an RTPS-Reader based on the resources available for the Writer/Reader pair such as bandwidth, CPU, and memory. These two auto-tuning protocols provide a latency reduction of several times the latency obtained with traditional approaches based on having a fix Send Window Size.

The third auto-tuning protocol of the present invention provides a way to obtain a good throughput/latency tradeoff between an RTPS-Writer and an RTPS-Reader under scenarios in which the publication rate changes over time. Current approaches using fix size batches provide poor latency for low publication rates (a few samples per second).

This latency can be several orders of magnitude higher than the latency provided with the auto-tuning protocol of the present invention.

$$(WriteFrequency-MinFrequency)/(MaxFrequency-MinFrequency))*MaxBatchSize.$$

In this exemplary implementation, we set MinFrequency to 10 samples per second, MaxFrequency to 10000 samples per second and MaxBatchSize to 32 KB (it is noted that these are all configuration parameters). The higher the frequency the more data we batch up to a maximum of 32 KB. Writing more than 10000 samples per second will always result in 32 KB batches.

Figure 9:
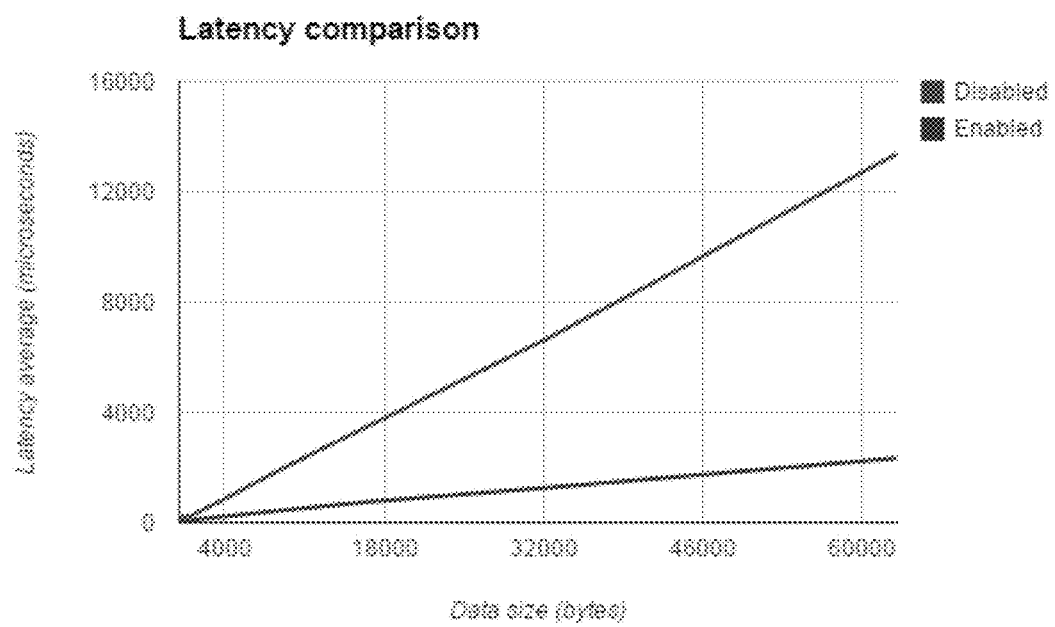
Figure 10:
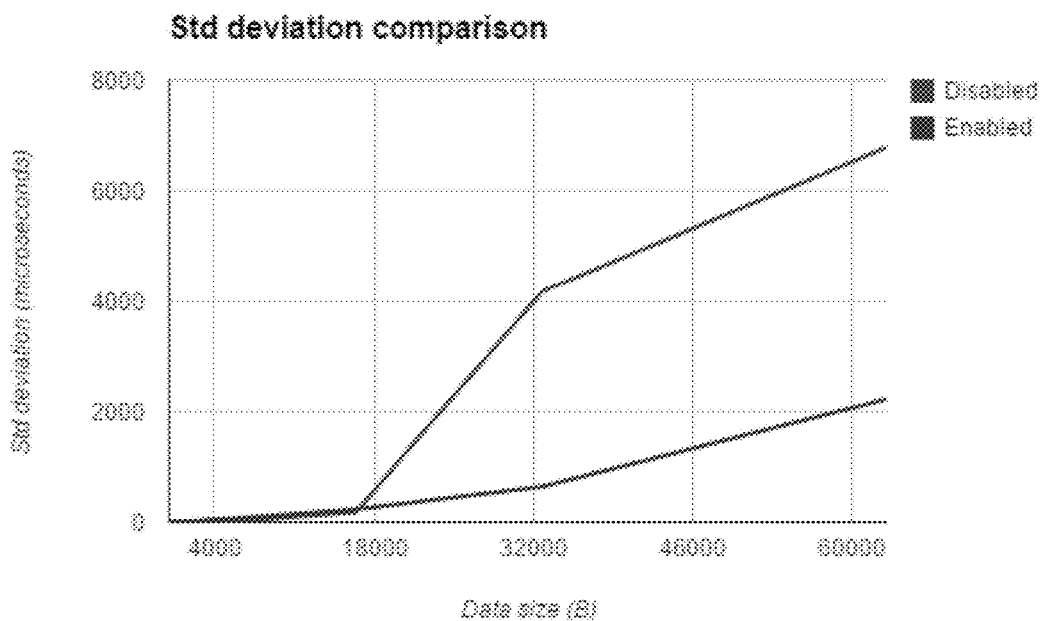

FIGS. 9-10 shows according to an exemplary embodiment of the invention the performance improvements to latency average (FIG. 9) and latency jitter (FIG. 10) by using (i) the system/method of this invention for dynamic adjustment of the send window size, (ii) the system/method of this invention for dynamic adjustment of the writing rate.

FIG. 11 shows a according to an exemplary embodiment of the invention performance improvements to latency average by using dynamic sample batching versus direct batching.

DETAILED DESCRIPTION

Dynamic Adjustment of the Send Window Size

The first auto-tuning mechanism includes maintaining a send window of variable size on the Writer to provide a flow control mechanism. If the network is congested, for example, the Writer will stop writing samples.

A Writer blocks when it tries to send a sample and the send window is full. Samples are removed from the send window as soon as they are acknowledged by all the Readers to which the Writer must send the samples.

Figure 1:
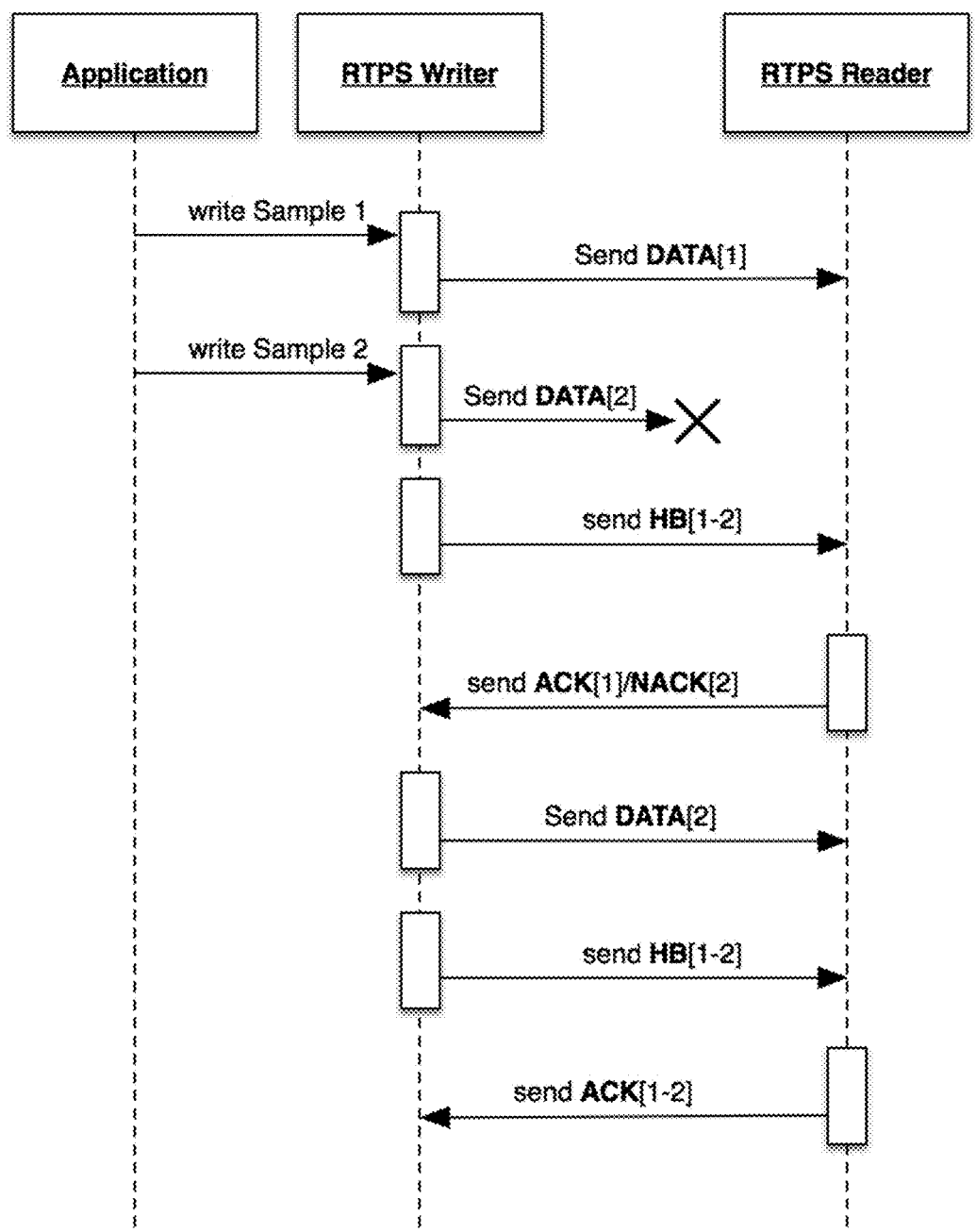
FIG. 1 shows a Basic reliable RTPS Message Exchange according to the current state of the art. HB=HEARTBEAT, ACK=Positive acknowledgment and NACK=Negative acknowledgment.
Figure 2:
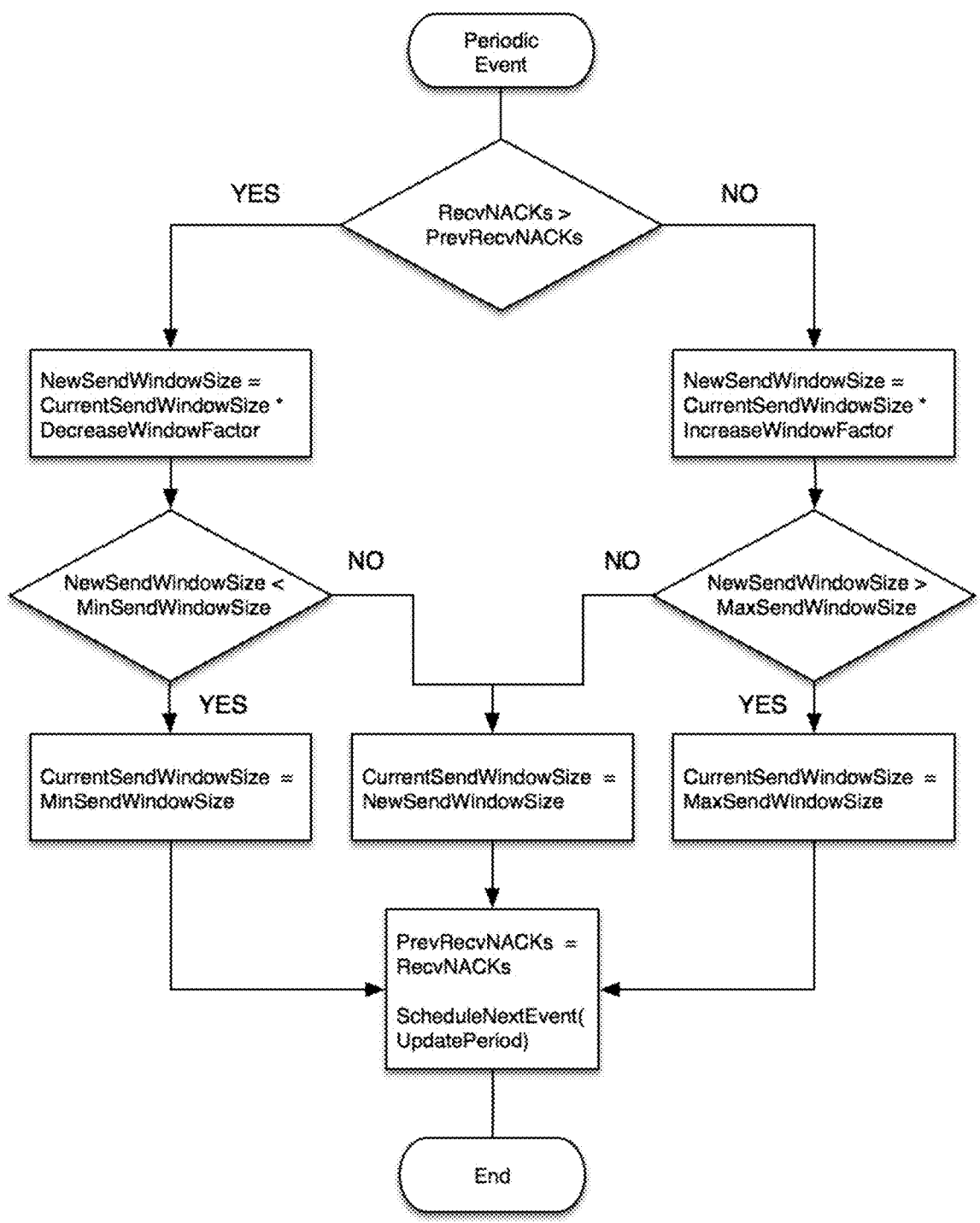
FIG. 2 shows a Send Window Update Algorithm according to an exemplary embodiment of the invention.

The size of the send window is updated periodically based on the number of RTPS NACK messages received by the Writer since the last update. FIG. 2 describes the window size update algorithm. In the algorithm:

The window size is updated within the interval [MinSendWindowSize,MaxSendWindowSize]

The window size is increased by a factor IncreaseWindowFactor where IncreaseWindowFactor>1

The window size is decreased by a factor DecreaseWindowFactor where DecreaseWindowFactor is strictly between 0 and 1, that is 0< DecreaseWindowFactor<1.

Update Period is the update period

RecvNACKs is the number of NACK messages received by the Writer in the current UpdatePeriod PrevRecvNACKs is the value of RecvNACKs in the previous UpdatePeriod.

Dynamic Adjustment of the Sending Rate

By introducing a variable send window size we provide a method to do flow control between the Writer and Reader(s) based on the number of NACKs received. This method optimizes the bandwidth usage and improves the average sample latency by reducing the number of repairs. However, samples that block the Writer will add a high latency component and they will increase jitter.

Figure 3:
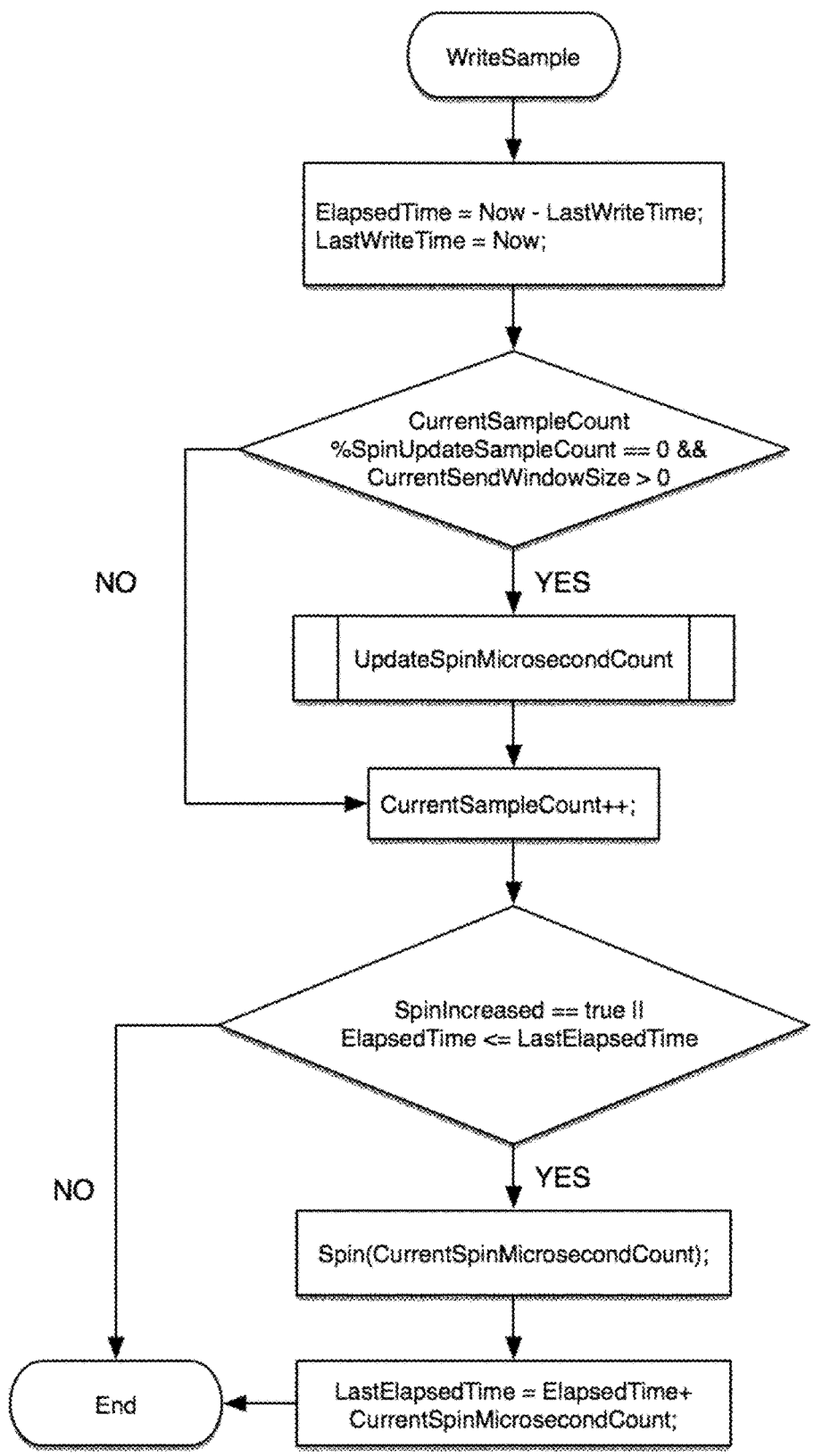
FIGS. 3-4 combined show the Send Rate Adjustment Algorithm according to an exemplary embodiment of the invention
Figure 4:
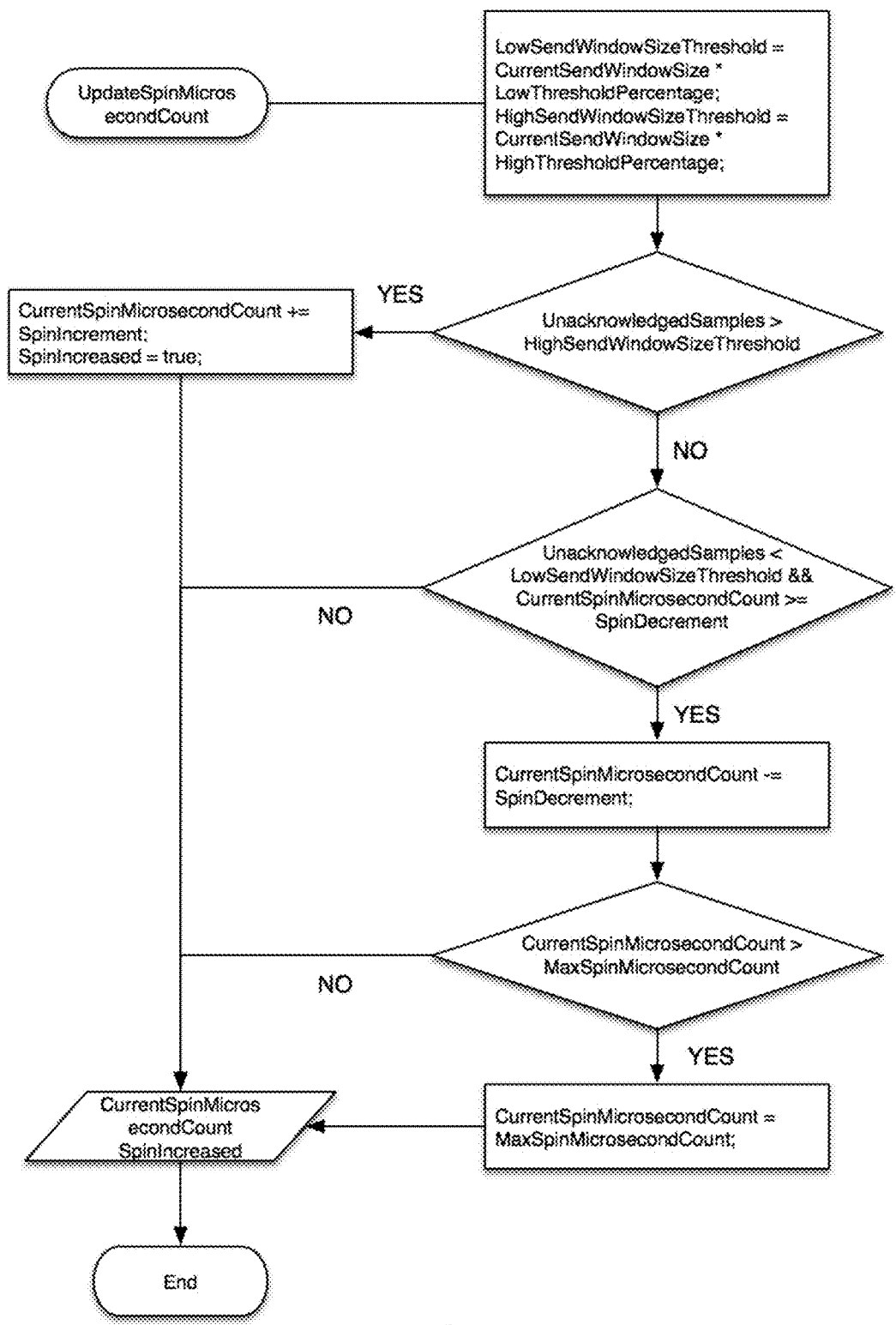

To reduce the latency jitter we introduce a method that dynamically adjusts the sending rate by doing busy-waiting between writes. This way the send window does not fill up and the Writer never blocks and yields CPU. FIGS. 3 and 4 describe the rate adjustment algorithm. In the algorithm:

CurrentSpinMicrosecondCount indicates the number of microseconds of busy-wait

MaxSpinMicrosecondCount indicates the maximum number of microseconds of busy-wait SpinMicrosecondIncrement indicates by how many microseconds the busy-wait can increase between consecutive writes SpinMicrosecondDecrement indicates by how many microseconds the busy-wait can decrease between consecutive writes CurrentSampleCount is the number of samples sent since the Writer started. The CurrentSpinMicrosecondCount used to do busy-wait is recalculated every SpinUpdateSampleCount LowSendWindowSizeThreshold and HighSendWindowSizeThreshold are used to determine when to update CurrentSpinMicrosecondCount. The idea is to keep the number of unacknowledged samples in the send window between these two thresholds.

ElapsedTime is the time elapsed in microseconds since the previous write operation (LastWriteTime). The amount of busy-wait is only adjusted every certain number of samples in order to allow the algorithm to stabilize. Because of this, if the speed at which the application writes samples decreases to a level in which spin is not necessary, the algorithm would be introducing an unnecessary component of latency until the spin becomes 0. To accomplish this the algorithm will not do busy-wait if the ElapsedTime is already greater than the CurrentSpinMicrosecondCount required.

Dynamic Sample Batching

The exchange of multiple RTPS messages, including DATA, HEARTBEAT and ACKNACK, to provide reliable communications between a Writer and one or multiple Readers introduces an overhead in bandwidth and CPU usage that affects the effective sample throughput in terms of samples per second.

The number of DATA, HEARTBEAT and ACKNACK messages can be reduced by grouping multiple application changes (samples) into a single RTPS DATA message. This practice is commonly known as message batching or message aggregation. When this is done the effective throughput can be increased dramatically, especially for small data samples (size<2048 bytes). Batching many smaller samples to be sent in a single RTPS DATA message optimizes bandwidth usage, reduces CPU utilization, and thus improves throughput.

Figure 5:
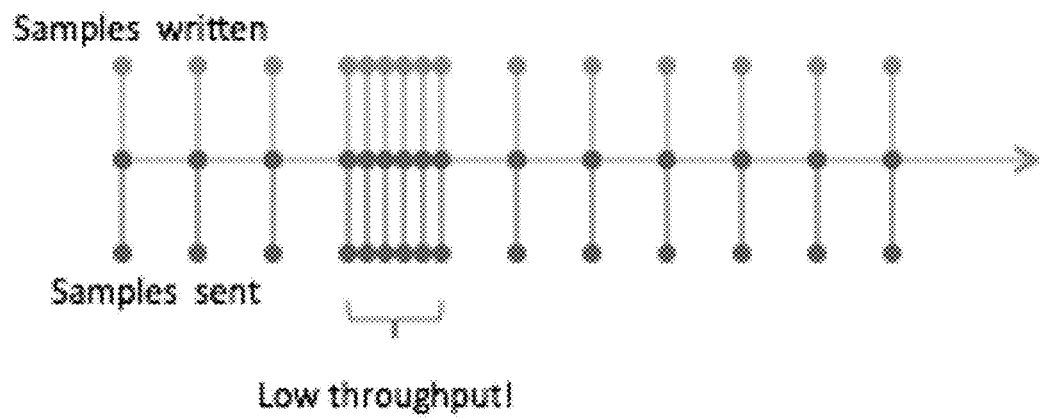
FIG. 5 shows a Writer Without Batching according to an exemplary embodiment of the invention.
Figure 6:
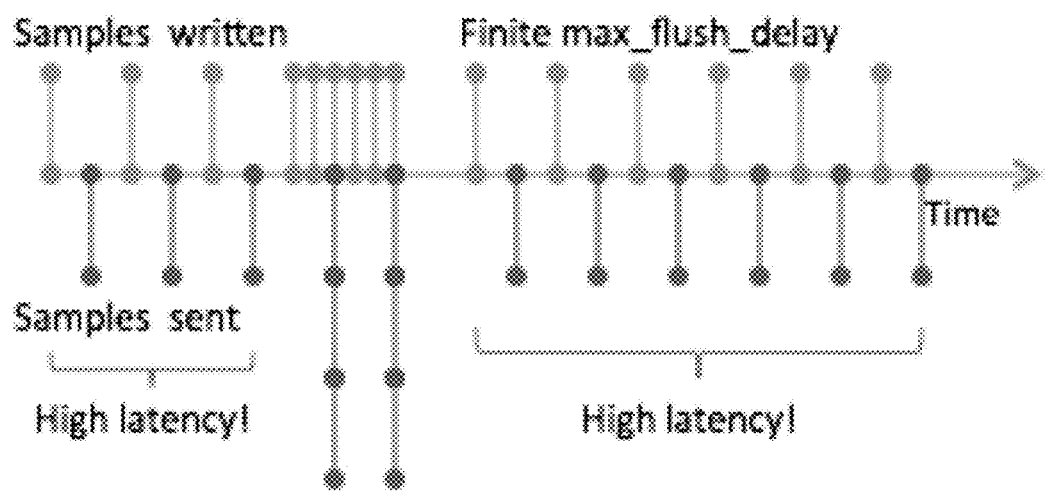
FIG. 6 shows a Writer With Batching according to an exemplary embodiment of the invention.

FIG. 5 shows the Writer behavior without batching. FIG. 6 shows the Writer behavior with batching. In this case, multiple samples up to a number of samples or number of bytes are grouped and sent together into a single DATA RTPS message. There is also a configurable flush delay after which the current batch (independently of the number of samples sent on the network) is sent.

The problem with a direct batching implementation is that although the throughput is dramatically increased at high publication rates, there is a significant penalty in latency at low publication rates as shown in FIG. 6.

Figure 7:
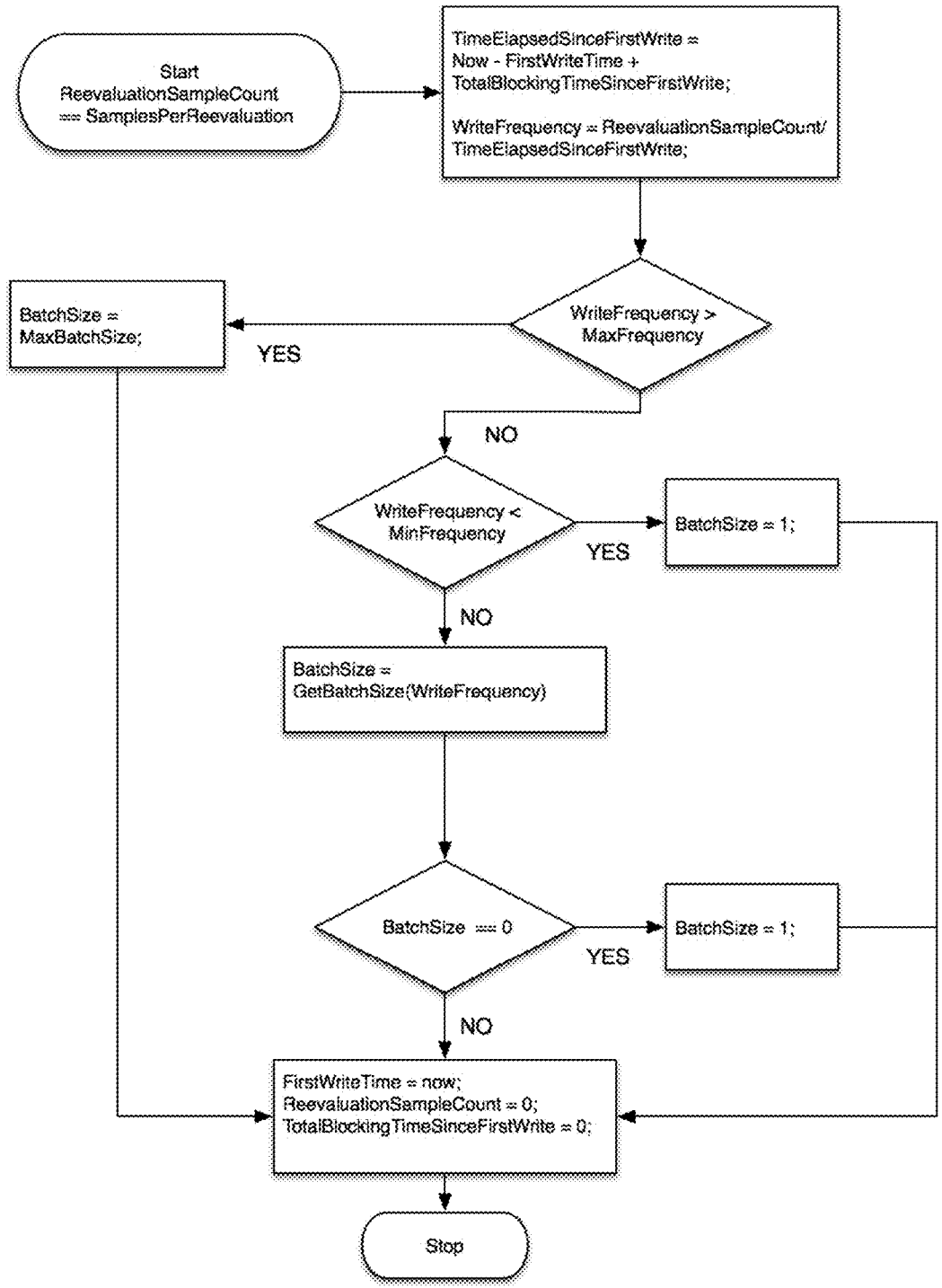
FIG. 7 shows a Batch Size Adjustment Algorithm according to an exemplary embodiment of the invention.

To mitigate this problem embodiments of this invention provide a technique for dynamically adjusting the size of a batch based on the current publication rate. This provides a good throughput/latency tradeoff. FIG. 7 describes the algorithm that adjusts the batch size. In the algorithm:

The batch size (in bytes) is adjusted every SamplesPerReevaluation

Figure 8:
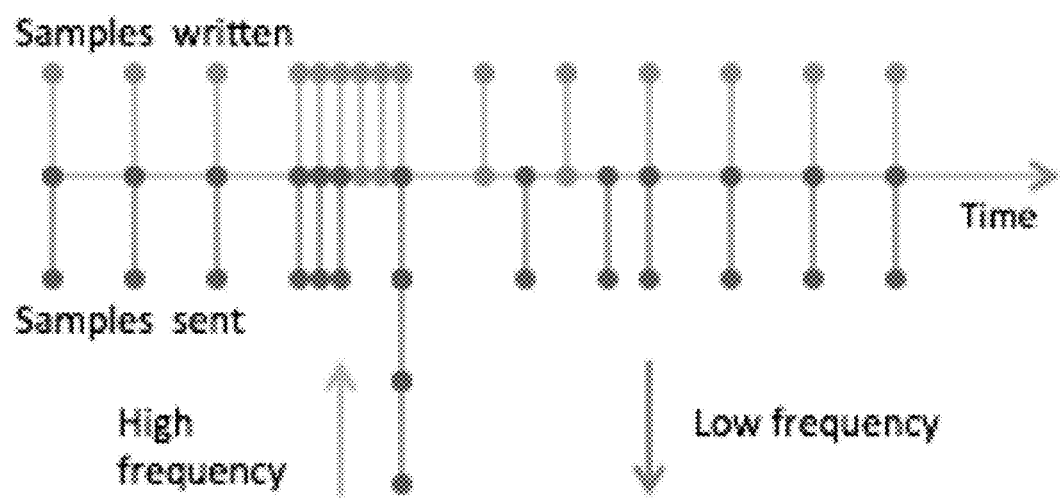
FIG. 8 shows a Writer with Dynamic Batching according to an exemplary embodiment of the invention. In this example only during higher publication frequency will data be batched to trade away low latency in favor of better throughput. In our specific implementation we used a linear interpolation to calculate the batch size. This is described infra in detail.

The batch size is adjusted between [1, MaxBatchSize] based on the write rate WriteFrequency The WriteFrequency is calculated without accounting for the blocking time (TotalBlokcingTimeSinceFirstWrite) generated because the Send Window is full GetBatchSize calculates the size of the batch based on the WriteFrequency. This function must be monotonic between 1 (for WriteFrequency=MinFrequency) and MaxBatchSize (for WriteFrequency=MaxFrequency). A possible implementation is to use a linear interpolation:

(WriteFrequency−MinFrequency)/(MaxFrequency−MinFrequency))*MaxBatchSize;

Adjusting the batch size dynamically provides a good throughput/latency tradeoff under scenarios in which the publication rate changes over time as shown in FIG. 8. Current approaches using fix size batches provide poor latency for low publication rates (a few samples per second). This latency can be several orders of magnitude higher than the latency provided with the auto-tuning protocol of the present invention.

Performance

The system/method for auto-tune reliable communications in RTPS Publish-Subscribe systems have been incorporated into the latest RTI Connext DDS 5.1.0. FIGS. 9-10 show the performance improvements to latency average and jitter by using:

The system/method of this invention for dynamic adjustment of the send window size.

The system/method of this invention for dynamic adjustment of the writing rate.

FIG. 11 shows the performance improvements to latency average by using dynamic sample batching versus direct batching. In FIG. 11, every three rows represent a single run, so the publication rate (the demand) fluctuates during the same run. The first three rows represent no batching. The next three rows represent vanilla batching. The last three rows represent dynamic batching. The results are consistent with FIGS. 5, 6, and 8.

Embodiments of the invention can be envisioned as a system and/or computer-implemented methods executed by a computer either standalone or part of a system in a communication network e.g. over the Internet.

What is claimed is:

1. A method executed by a device for adaptively auto-tuning data communications over a communication network, comprising:

executing an Object Management Group (OMG) Real-Time Publish Subscribe (RTPS) Protocol operable over the communication network with a remote software application writing samples to an RTPS-Writer, the RTPS-Writer sending the samples encapsulated in an RTPS-DATA message to an RTPS-Reader, a Send Window defined between the RTPS-Writer and RTPS-Reader, a Send Window Size in the number of the RTPS-DATA messages defined between the RTPS-Writer and RTPS-Reader, and a Writing Rate defined for the RTPS-Writer;

executing a first auto-tuning protocol, implemented as a computer software executable by the device, for dynamically adjusting the Send Window Size based on a number of RTPS-NACK messages received by the RTPS-Writer, wherein the RTPS-NACK message is defined as a message sent from the RTPS-Reader to the RTPS-Writer indicating that some of the RTPS-DATA messages are missing;

executing a second auto-tuning protocol, implemented as a computer software executable by the device, for dynamically adjusting the Sending Rate to avoid that: (i) the number of samples in the Send Window equals the size of the Send Window, and (ii) the RTPS-Writer blocks or yields CPU executing a third auto-tuning protocol, implemented as a computer software executable by the device, for dynamically adjusting the size of an RTPS-BATCH based on the publication rate, wherein the RTPS-BATCH is defined as the RTPS-DATA message encapsulating more than one sample, and wherein the publication rate is defined as the number of samples send by the RTPS-Writer per second.

* * * * *